(12) United States Patent
Yezerets et al.

(10) Patent No.: US 9,051,862 B2
(45) Date of Patent: Jun. 9, 2015

(54) DIAGNOSIS AND TREATMENT OF SELECTIVE CATALYTIC REDUCTION CATALYST

(71) Applicant: Cummins IP, Inc., Columbus, IN (US)

(72) Inventors: Aleksey Yezerets, Columbus, IN (US); Neal W. Currier, Columbus, IN (US); Xu Chen, Columbus, IN (US); Junhui Li, Columbus, IN (US); Krishna Kamasamudram, Columbus, IN (US); Hongbin Ma, Columbus, IN (US); Tamas Szailer, Seymour, IN (US); Cary Henry, Columbus, IN (US); Roger Fox, Columbus, IN (US)

(73) Assignee: CUMMINS IP, INC., Columbus, IN (US)

( * ) Notice: Subject to any disclaimer, the term of this patent is extended or adjusted under 35 U.S.C. 154(b) by 42 days.

(21) Appl. No.: 14/020,627

(22) Filed: Sep. 6, 2013

(65) Prior Publication Data

US 2015/0072855 A1    Mar. 12, 2015

(51) Int. Cl.
    *B01J 38/48*    (2006.01)
    *F01N 3/20*     (2006.01)
    *B01J 23/92*    (2006.01)

(52) U.S. Cl.
    CPC .............. *F01N 3/2066* (2013.01); *B01J 23/92* (2013.01)

(58) Field of Classification Search
    CPC ........................................................ B01J 38/48
    USPC ................... 502/22, 25, 27, 514, 353, 517
    See application file for complete search history.

(56) References Cited

U.S. PATENT DOCUMENTS

| | | | |
|---|---|---|---|
| 4,615,991 A | 10/1986 | Obayashi et al. | |
| 4,851,380 A | 7/1989 | Van Leirsburg et al. | |
| 4,937,215 A | 6/1990 | Murakawa et al. | |
| 5,270,272 A | 12/1993 | Galperin et al. | |
| 6,300,268 B1 | 10/2001 | Lapidus et al. | |
| 6,455,596 B2 | 9/2002 | Lapidus et al. | |
| 6,484,733 B2 * | 11/2002 | Budin et al. | 134/22.19 |
| 8,141,340 B2 | 3/2012 | Garimella et al. | |
| 8,256,208 B2 | 9/2012 | Wills et al. | |
| 8,481,453 B2 * | 7/2013 | Chapman | 502/350 |
| 2006/0058176 A1 | 3/2006 | Shirakura | |
| 2009/0005235 A1 | 1/2009 | Lee et al. | |
| 2011/0047970 A1 | 3/2011 | Yezerets et al. | |

OTHER PUBLICATIONS

International Search Report and Written Opinion of the International Searching Authority, issued Nov. 19, 2014.

* cited by examiner

*Primary Examiner* — Edward Johnson
(74) *Attorney, Agent, or Firm* — Foley & Lardner LLP

(57) ABSTRACT

Described herein is a selective catalytic reduction (SCR) catalyst treatment system that includes a vanadium-based SCR catalyst contaminated with a water-soluble contaminant. The SCR catalyst treatment system also includes a water delivery system that is configured to apply water to the vanadium-based SCR catalyst to remove the water-soluble contaminant from the vanadium-based SCR catalyst.

19 Claims, 4 Drawing Sheets

DIAGNOSIS AND TREATMENT OF SELECTIVE CATALYTIC REDUCTION CATALYST

FIELD

The subject matter of this application relates generally to exhaust aftertreatment systems for internal combustion engines, and more specifically to diagnosing and treating a vanadium-based selective catalytic reduction (SCR) catalyst.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides (NOx), and unburned hydrocarbons (UHC).

Exhaust aftertreatment systems receive and treat exhaust gas generated by an internal combustion engine. Typical exhaust aftertreatment systems include any of various components configured to reduce the level of regulated exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

The SCR catalyst reduces the amount of nitrogen oxides (NOx) present in the exhaust gas. Generally, the SCR catalyst is configured to reduce NOx into constituents, such as $N_2$ and $H_2O$, in the presence of ammonia ($NH_3$) and the catalytic materials of the SCR catalyst. Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of gaseous ammonia. Accordingly, conventional systems are designed to inject a reductant (e.g., diesel exhaust fluid (DEF), ammonia, metal chloride salt, etc.) into the exhaust gas, which is capable of decomposing into gaseous ammonia in the presence of exhaust gas under certain conditions. The reductant commonly used by conventional exhaust aftertreatment systems is DEF, which is a urea-water solution.

A common SCR catalyst used in some parts of the world is a vanadium-based SCR catalyst. Generally, a vanadium-based SCR catalyst includes a carrier layer and a catalytic layer made from vanadium-based catalytic materials. Vanadium-based SCR catalysts provide certain advantages over SCR catalyst made from other catalytic materials. However, vanadium-based SCR catalysts are particularly susceptible to sulfur poisoning when sulfur is present in the exhaust gas stream passing through the SCR catalysts. Sulfur poisoning tends to reduce the efficiency of NOx reduction or conversion on the SCR catalyst.

For fuels with minimal sulfur content, sulfur poisoning of vanadium-based catalysts is avoided. However, for fuels with relatively high sulfur content, sulfur poisoning of vanadium-based catalysts is quite common. Accordingly, some engine systems include on-board diagnostics that detect the presence of sulfur poisoning, and derate the engine when sulfur poisoning is detected. Engines derated due to sulfur poisoning require servicing, which can be time consuming and expensive. Additionally, verification processes for verifying the presence of sulfur poisoning on a vanadium-based catalyst (e.g., to avoid false positives), or recovery processes for recovering a poisoned SCR catalyst, may be unavailable or ineffective. Therefore, vanadium-based catalysts initially diagnosed with sulfur poisoning commonly are replaced with new catalysts and discarded, which introduces high warranty costs and vanadium waste disposal problems. Alternatively, even if effective verification and recovery processes are available, such processes typically require excessive costs for operation and extensive personnel training.

SUMMARY

The subject matter of the present application has been developed in response to the present state of the art, and in particular, in response to the problems and needs in the exhaust aftertreatment catalyst art that have not yet been fully solved by currently available diagnostic and recovery processes for exhaust aftertreatment catalysts. Generally, the present application describes various embodiments of an apparatus, system, and method for diagnosing and recovering a poisoned SCR catalyst that overcome many of the shortcomings of the prior art.

According to one embodiment, an SCR catalyst treatment system includes a vanadium-based SCR catalyst contaminated with a water-soluble contaminant, and a water delivery system configured to apply water to the vanadium-based SCR catalyst to remove the water-soluble contaminant from the vanadium-based SCR catalyst.

In some implementations of the SCR catalyst treatment system, the water-soluble contaminant includes sulfur. The water-soluble contaminant can be a sulfate salt. In certain implementations, the water-soluble contaminant is at least one of ammonium sulfate salt or ammonium bisulfate salt.

According to certain implementations, the water delivery system includes a vessel that contains water. The vanadium-based SCR catalyst is positioned within the water contained by the vessel. The SCR catalyst treatment system may also include a contaminant removal verification system that includes a contaminant detection device to detect a quantity of contaminant in the water. The contaminant removal verification system further includes a contaminant detection device to detect a quantity of contaminant on the vanadium-based SCR catalyst. The contaminant detection device to detect the quantity of contaminant in the water is different than the contaminant detection device to detect the quantity of contaminant on the vanadium-based SCR catalyst. The removal verification system can determine the removal of the contaminant from the vanadium-based SCR catalyst based on a difference between the quantity of contaminant on the vanadium-based SCR catalyst and the quantity of contaminant in the water. The removal verification system indicates the vanadium-based SCR catalyst is decontaminated if the difference between the quantity of contaminant on the vanadium-based SCR catalyst and the quantity of contaminant in the water is below a threshold.

In some implementations, the SCR catalyst treatment system further includes an exhaust aftertreatment system in exhaust gas receiving communication with an internal combustion engine. The vanadium-based SCR catalyst is positioned within the exhaust aftertreatment system. Additionally, the water delivery system is coupled to the exhaust aftertreatment system and configured to dose water into the exhaust aftertreatment system. The water delivery system can include a water source and a doser that injects water from the water source into exhaust gas upstream of the vanadium-based SCR catalyst. In certain implementations, the water delivery system includes a water source and a doser that injects water from the water source directly onto the vanadium-based SCR catalyst.

According to another embodiment, a method for treating an SCR catalyst contaminated with a sulfur component includes removing the sulfur component from the SCR catalyst via a process consisting of applying water to the SCR catalyst. The SCR catalyst can be a vanadium-based SCR catalyst and the sulfur component can be a sulfate salt. Applying water to the SCR catalyst may include soaking the SCR catalyst in water. The SCR catalyst can form part of an exhaust aftertreatment system, and applying water to the SCR catalyst can include dosing water into the exhaust aftertreatment system.

In some implementations, the method further includes determining a quantity of sulfur component removed from the SCR catalyst by measuring a quantity of sulfur in the water. The method may also include measuring a quantity of sulfur component on the SCR catalyst, and verifying removal of the sulfur component from the SCR catalyst by comparing the quantity of sulfur component in the water and the quantity of sulfur component on the SCR catalyst.

In yet another embodiment, an SCR catalyst treatment system includes a vanadium-based SCR catalyst contaminated with a sulfate salt, and a vessel containing a volume of water. The vanadium-based SCR catalyst is positioned within the volume of water, and the water removes the sulfate salt from the vanadium-based SCR catalyst over time. The system further includes a first sulfate salt detection device that measures a quantity of sulfate salt on the vanadium-based SCR catalyst, and a second sulfate salt detection device that measures a quantity of sulfate salt in the volume of water.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
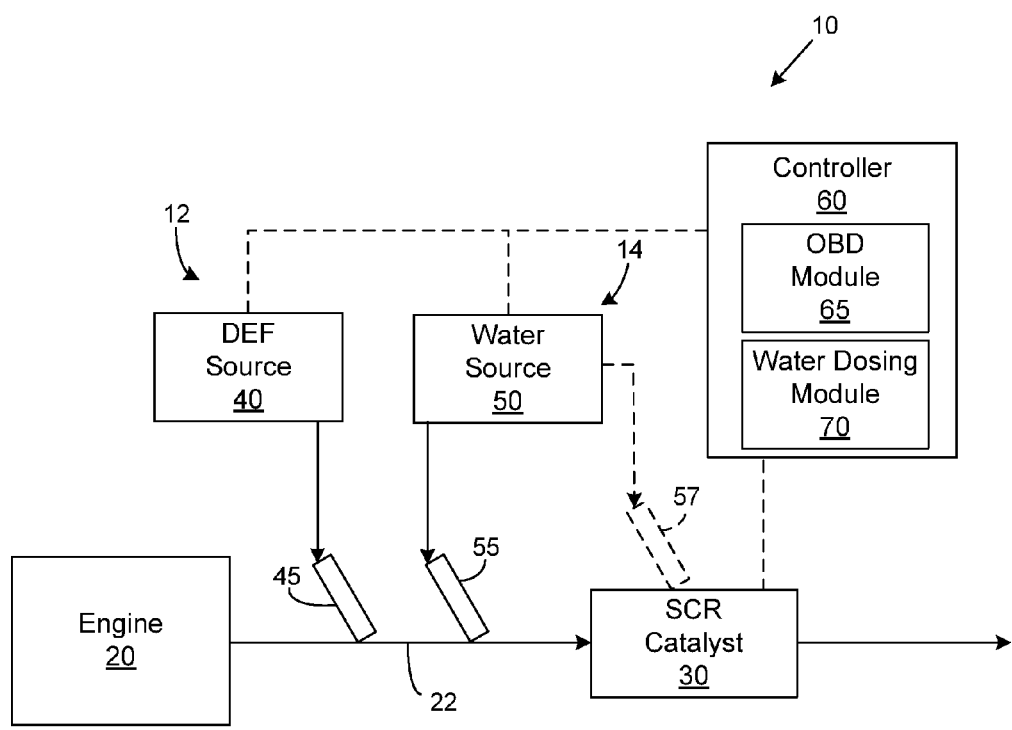
FIG. 1 is a schematic block diagram of an internal combustion engine according to one embodiment.

As shown in FIG. 1, one embodiment of an internal combustion engine system 10 includes an engine 20 and an SCR catalyst 30. The engine 20 can be a compression-ignited internal combustion engine, such as a diesel fueled engine, or a spark-ignited internal combustion engine, such as a gasoline fueled engine operated lean. Generally, within the internal combustion engine 20, air from the atmosphere is combined with fuel to power the engine. Combustion of the fuel and air produces exhaust gas that is operatively vented to an exhaust manifold and eventually an exhaust aftertreatment system. The SCR catalyst 30 may form part of the exhaust aftertreatment system of the engine system 10. Basically, the exhaust aftertreatment system remove various chemical compound and particulate emissions present in the exhaust gas received from the engine 20. More particularly, the SCR catalyst 30 of the engine system 10 is configured to convert NOx (NO and $NO_2$ in some fraction) to $N_2$ and other compounds in the presence of ammonia.

The engine system 10 includes a diesel exhaust fluid (DEF) delivery system 12 for delivering DEF into exhaust gas upstream of the SCR catalyst 30. In certain configurations, DEF is a urea-water solution. However, in some implementations, DEF can be replaced with any of various reductants, such as diesel fuel or diesel oil, or ammonia in an aqueous or solid state. The DEF delivery system 12 includes a DEF source 40 in DEF supplying communication with a DEF doser or injector 45. The DEF delivery system 12 may include other DEF delivery components, such as pumps, accumulators, valves, and the like, designed to facilitate the transfer of DEF from the DEF source 40 to the doser 45, and from the doser to the exhaust gas. After being dosed into the exhaust gas, the DEF decomposes to produce ammonia prior to and/or after entering the SCR catalyst 30. As mentioned above, the ammonia reacts with NOx in the presence of catalytic materials of the SCR catalyst 30 to reduce the NOx to less harmful emissions.

The SCR catalyst 30 includes a catalyst bed that is exposed to the exhaust gas flowing through an exhaust line 22 from the engine 20. The catalyst bed may be arranged to define a plurality of exhaust flow channels with a honeycomb or plate-like shape as is known in the art. Generally, the catalyst bed includes a carrier layer and a catalytic layer made from a catalytic material. The carrier layer provides a base for the catalytic layer, which is exposed to NOx in the exhaust gas. The NOx reacts with the catalytic material of the catalytic layer in the presence of ammonia to reduce the NOx. In the present embodiment, the catalytic material is vanadium (V) such that the SCR catalyst 30 is defined as a vanadium-based SCR catalyst. In other words, the catalytic material is not a zeolite and the SCR catalyst 30 of the present embodiment is not a zeolite-based SCR catalyst. In some implementations, the vanadium-based SCR catalyst 30 has between about 0.1 and about 5 weight-percent of vanadium as the active material, which is impregnated on a support or carrier layer, such as titanium oxide.

The engine system 10 also includes a controller 60 in electrical communication with the DEF delivery system 12. The controller 60 includes instructions that when executed control the timing and quantity of DEF dosed into the exhaust gas. The controller 60 may also be in electrical communication with the SCR catalyst 30 via one or more virtual or physical sensors that determine various operating conditions of the SCR catalyst specifically and the engine system 10 generally. For example, in certain implementations, the engine system 10 includes one or more sensors and/or logic that the controller 60 utilizes for determining a quantity or level of contamination of a contaminant on the SCR catalyst 30.

According to one implementation, the controller 60 includes an on-board diagnostics (OBD) module 65 that compares the determined quantity or level of contamination on the SCR catalyst 30 against an OBD threshold value. If the quantity or level of contamination does not meet the OBD threshold value, then a contamination alert of the OBD system is not triggered. However, if the quantity or level of contamination meets the OBD threshold value, then the contamination alert of the OBD system is triggered, and the engine 20 can be correspondingly derated to reduce further contamination or emissions compliance failures. Accordingly, the controller 60 and OBD module 65 monitor the condition of the SCR catalyst 30 and issue an OBD alert when the level of contamination on the SCR catalyst 30 reaches a regulated value.

Generally, the contaminant is a water-soluble contaminant. In some implementations, the contaminant is sulfur introduced into the exhaust gas due to a relatively high-sulfur content of fuel combusted by the engine 20. The sulfur content of fuel in certain regions of the world is less regulated, or certain regions of the world allow higher sulfur content in fuel. Excess sulfur in the exhaust gas accumulates onto the catalytic layer of the SCR catalyst 30 in the form of sulfate salt (e.g., ammonium sulfate salt and/or ammonium bisulfate salt), which can severely poison (e.g., plug) the vanadium catalysts sites on the SCR catalyst and limit the NOx-reduction efficiency of the SCR catalyst.

According to one embodiment, the controller 60 includes a water dosing module 70 with instructions that when executed control the timing and quantity of water dosed into the exhaust gas by a water dosing system 14 of the engine system 10. The water dosing system 14 includes a water source 50 in water supplying communication with a water doser or injector 57. The water delivery system 14 may include other water delivery components, such as pumps, accumulators, valves, and the like, designed to facilitate the transfer of water from the water source 50 to the doser 57, and from the doser to the exhaust gas. In one implementation, the controller 60 is configured to command the water delivery system 14 to dose water into the exhaust gas when the quantity or level of contamination meets an upper threshold value. The upper threshold value can be equal to or less than an OBD threshold value.

Because the contaminant is water-soluble, the water dosed into the exhaust gas by the water delivery system 14 breaks down the contaminant accumulated on the SCR catalyst 30 as it makes contact with the contaminant. As the contaminant breaks down, the contaminant is released or extracted from the SCR catalyst 30. In one implementation, the timing and quantity of water dosed by the water dosing system 14 is controlled to remove at least a dominant (e.g., majority) portion of the contaminant from the SCR catalyst 130. For example, more frequent or higher quantity dosing is implemented for higher contaminant accumulation levels. With at least the dominant portion of the contaminant removed from the SCR catalyst 130, the loss of NOx-reduction efficiency of the SCR catalyst due to the contaminant is substantially recovered, and the SCR catalyst need not be discarded.

The released contaminant can be expelled from the engine system 10 through the exhaust line 22, or may accumulate within a receptacle away from the SCR catalyst 30 that can be periodically removed, replaced, or cleaned. In some alternative embodiments, the water delivery system 14 may include a water isolation feature that isolates the dosed water from exhaust system components other than the SCR catalyst 30 or components directly associated with the SCR catalyst. For example, in one implementation, the water isolation feature may be an annular tube-like element positioned about the SCR catalyst 30 and through-which water is dosed onto the SCR catalyst, but prevented from entering the exhaust gas, which can be bypassed around the SCR catalyst during water dosing events via bypass components known in the art.

Because the SCR catalyst 30 is treated (e.g., cleansed) with water to remove contaminants while the SCR catalyst remains in-place (e.g., in situ) within the exhaust system of the engine system 10, the SCR catalyst 30 does not need to be removed from the system to be treated. In this manner, time and expense associated with removing, treating, and reinstalling the SCR catalyst 30 can be avoided or reduced with the water delivery system 14 of the engine system 10. Notwithstanding the advantages associated with the in situ treatment of the SCR catalyst 30 using the water delivery system 14, there may be other advantages to removing the SCR catalyst 30 from the engine system 10 and treating it using an SCR treatment system separate from the engine system 10. For example, in some embodiments, the SCR catalyst 30 can be removed from the engine system 10 when the OBD module 65 triggers a contamination alert. Put another way, the contamination alert notifies an operator that the SCR catalyst 30 is contaminated and requires a contaminant-removal treatment.

Figure 2:
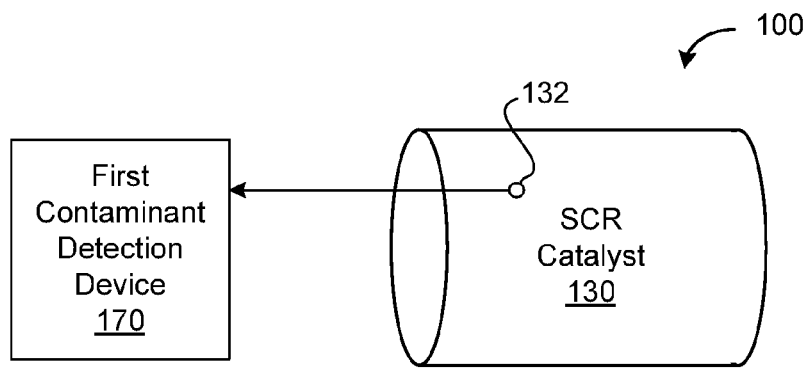
FIG. 2 is a schematic block diagram of a contaminant accumulation detection system according to one embodiment.

Referring to FIG. 2, after the contaminated SCR catalyst 30 is removed from an engine system, such as the engine system 10, a first contaminant detection device 170 of a contaminant accumulation detection system 100 detects or measures a quantity (e.g., percent by weight) of contaminant on or in the SCR catalyst. In one implementation, the first contaminant detection device 170 is an inductively coupled plasma optical emission spectroscopy (ICP-OES) device or other spectroscopy device. The ICP-OES device receives and analyzes one or more samples 132 from the SCR catalyst 130 and measures the quantity or concentration of contaminant on or in the samples. Via extrapolation techniques, the total quantity or concentration of contaminant on or in the entire SCR catalyst 130 is estimated. The total quantity of contaminant on or in the SCR catalyst 130 can be considered a pre-treatment quantity of contaminant.

Figure 3:
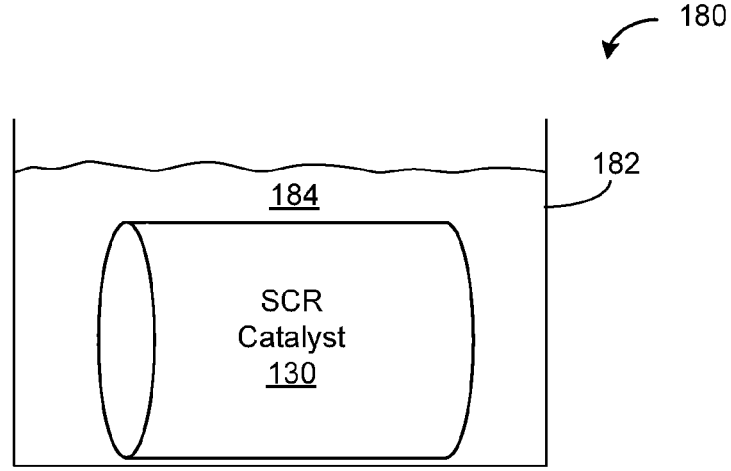
FIG. 3 is a schematic block diagram of an SCR catalyst treatment system according to one embodiment.
Figure 4:
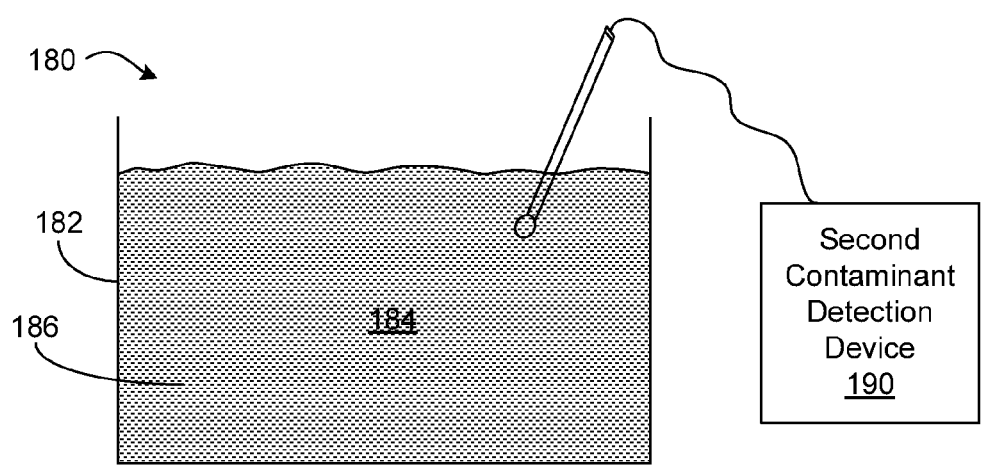
FIG. 4 is a schematic block diagram of the SCR catalyst soaking system with a contaminant accumulation detection device for detecting the quantity of contaminant in the water of the SCR catalyst soaking system according to one embodiment.

As shown in FIG. 3, after the pre-treatment quantity of contaminant is determined, the SCR catalyst 130 is treated by a treatment system 180. The treatment system 180 includes a vessel, container, or reservoir 182 containing a volume of water 184. The water 184 is at least substantially free of contaminant, and can be distilled or deionized water in some implementations. Further, the water can be any of various temperatures, however, in some implementations, the temperature of the water is above room temperature. In some implementations, the water can be any of various aqueous solutions capable of extracting contaminant from the SCR catalyst 130, such as a low concentration ammonium hydroxide solution, for example. The SCR catalyst 130 is positioned into the vessel 182 such that the SCR catalyst is completely immersed in the volume of water 184. Accordingly, the vessel 182 preferably is large enough to contain the entire SCR catalyst 130, and the volume of water 184 is large enough to immerse the SCR catalyst. The immersed SCR catalyst 130 soaks in the water 184 for a desired amount of time. In some implementations, the desired amount of time may range from a few minutes to several hours. Referring to FIG. 4, as the SCR catalyst 130 soaks in the water 184, the water breaks down the contaminant 186, which subsequently releases or is extracted from the surface of the SCR catalyst into the water as shown. Therefore, in certain embodiments, water-soluble contaminants, such as sulfates and sulfate salts, coated on the SCR catalyst 130 can be removed with water only without any additional contaminant treatment processes or solutions.

Following the desired amount of time, the SCR catalyst 130 is removed from the water 184, leaving behind a contaminant-containing volume of water 184. In the illustrated embodiment, a second contaminant detection device 190 detects or measures a total quantity of contaminant 186 in the water 184. In one implementation, the second contaminant detection device 190 is different than the first contaminant detection device 170. For example, the second contaminant detection device 190 can be an ion chromatography (IC) device or other chromatography device. In another implementation, the first and second contaminant detection devices 170, 190 are the same or similar types of devices.

The treatment system 180 may include a contaminant-removal verification feature to verify that contaminant has been satisfactorily removed via the soaking of the SCR catalyst 130 in the water 184. Removal or extraction of the contaminant from the SCR catalyst 130 is verified by the verification feature by comparing the total quantity of contaminant on the SCR catalyst 130 detected by the first contaminant detection device 170 and the total quantity of contaminant 186 in the water 184 detected by the second contaminant detection device 190 following soaking of the SCR catalyst and removal of the SCR from the water. Generally, soaking the SCR catalyst 130 in the water 184 for the desired period of time removes most, if not all, of the contaminant from the SCR catalyst. Accordingly, following a successful soaking event, the total quantity of contaminant on the SCR catalyst 130 before soaking and the total quantity of contaminant 186 in the water 184 after soaking should be close to the same.

According to one implementation, if the verification feature finds a difference between the total quantity of contaminant on the SCR catalyst 130 prior to soaking and the total quantity of contaminant 186 in the water 184 after soaking is less than a threshold amount, then the feature indicates that the SCR catalyst has been sufficiently cleaned of contaminant. In contrast, if the verification feature finds a difference between the total quantity of contaminant on the SCR catalyst 130 prior to soaking and the total quantity of contaminant 186 in the water 184 after soaking is more than the threshold amount, then the feature indicates that the SCR catalyst has not been sufficiently cleaned of contaminant. The threshold amount may be associated with removal of at least a dominant quantity of contaminant on the SCR catalyst 130. For example, in one implementation, the threshold amount may be between about 0.03% by weight and about 0.2% by weight. The verification feature can be a processor-based module in data receiving communication with the first and second contaminant detection devices 170, 190.

Should the verification feature find that the SCR catalyst 130 has been sufficiently cleaned (e.g., at least a dominant portion of the contaminant has been removed from the SCR catalyst), then the SCR catalyst is dried and ready for reinstallation into an exhaust system. With at least the dominant portion of the contaminant removed from the SCR catalyst 130, the loss of NOx-reduction efficiency of the SCR catalyst due to the contaminant is substantially recovered, and the SCR catalyst can be reused.

However, should the verification feature find that the SCR catalyst 130 has not been sufficiently cleaned, then the SCR catalyst 130 can be discarded or re-treated as desired. The detection system 100 and/or treatment system 180 can be utilized to re-treat the pre-treated SCR catalyst 130 in a manner as described above, but replacing the contaminant-containing volume of water 184 with a fresh supply of water before soaking the pre-treated SCR catalyst in the water if the detection system 100 is used to measure a new contaminant accumulation quantity on the SCR catalyst 130. In some implementations, the SCR catalyst 130 is discarded if the verification feature finds the difference between the total quantity of contaminant on the pre-treated SCR catalyst 130 prior to soaking and the total quantity of contaminant 186 in the water 184 after soaking the pre-treated SCR catalyst is more than the threshold amount. Alternatively, the pre-treated SCR catalyst 130 may be continuously re-treated until the difference between the total quantity of contaminant on the pre-treated SCR catalyst 130 prior to soaking and the total quantity of contaminant 186 in the water 184 after soaking the pre-treated SCR catalyst is less than the threshold amount.

Although the detection system 100 and treatment system 180 are shown, in other embodiments, any of various other detection and treatment systems can be used to detect the level of contaminant on or in the SCR catalyst 130 and treat the SCR catalyst with water as desired.

Figure 5:
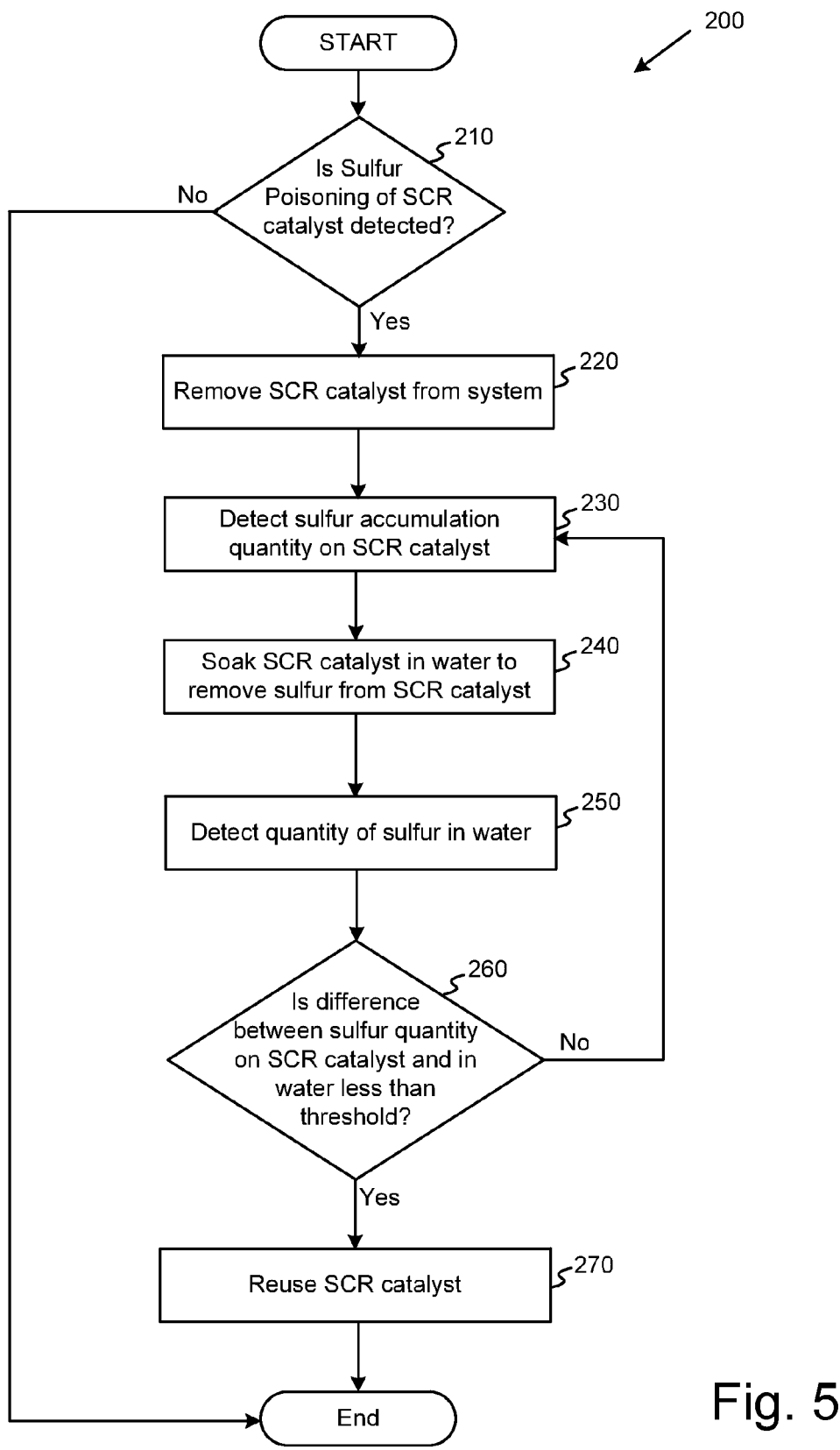
FIG. 5 is a flow chart diagram depicting a method for diagnosing and treating a removed vanadium-poisoned SCR catalyst according to one embodiment.

Referring to FIG. 5, a method 200 for treating an SCR catalyst of an engine system (e.g., an exhaust system of the engine system) is shown. The method 200 may be performed via operation of the detection system 100 and treatment system 180 as discussed above. The method 200 begins by detecting or determining if the SCR catalyst is poisoned with a contaminant, such as sulfur, at 210. According to certain implementations, an SCR catalyst is determined to be poisoned with a contaminant when the measured or estimated quantity of contaminant on the SCR catalyst reaches a predetermined level. If the SCR catalyst is not poisoned with a contaminant, then the method 200 ends. However, if the SCR catalyst is poisoned with a contaminant, then the method 200 proceeds to remove the SCR catalyst from the engine system at 220. Although not shown, the method 200 may first alert an operator that the SCR catalyst is poisoned before the SCR catalyst is removed from the engine system.

After being removed from the engine system, the quantity of contaminant accumulated on the SCR catalyst is detected at 230 using any of various detection or measurement devices. The detected contaminant accumulation quantity can be electronically stored for future use. After detecting the contaminant accumulation quantity at 230, the method 200 includes soaking the SCR catalyst in water, or other similar aqueous solution, for a desired period of time to remove contaminant from the SCR catalyst at 240. Following the desired period of time, the SCR catalyst is removed from the water, and the method 200 proceeds to contaminant removal verification sub-processes, which include detecting the quantity of contaminant in the water at 250. The verification sub-process includes comparing the detected contaminant accumulation quantity on the SCR catalyst obtained at 230 with the detected contaminant quantity in the water obtained at 250. Based on the comparison, a difference between the detected contaminant accumulation quantity on the SCR catalyst and the detected contaminant quantity in the water is determined and compared against a threshold. If the difference is less than the threshold as determined at 260, then the catalyst is reused at 270. However, if the difference is more than the threshold as determined at 260, then the illustrated method 200 returns to perform steps 230, 240, 250, 260 as discussed above, but with the additional step of replacing the contaminant-containing water with fresh or substantially contaminant-free water before re-soaking the SCR catalyst at 240. Accordingly, the steps 230, 240, 250, 260 of the method 200 may be repeated until the difference is less than the threshold as determined at 260.

In other embodiments, if the determination at 260 is negative, the method 200 may return directly to re-soak the SCR catalyst in the contaminant-containing water at 240 without re-detecting the contaminant accumulation quantity on the SCR catalyst at 230. Alternatively, if the determination at 260 is negative, in some embodiments of the method, the SCR catalyst is discarded without repeated the steps 230, 250, 250, 260.

Figure 6:
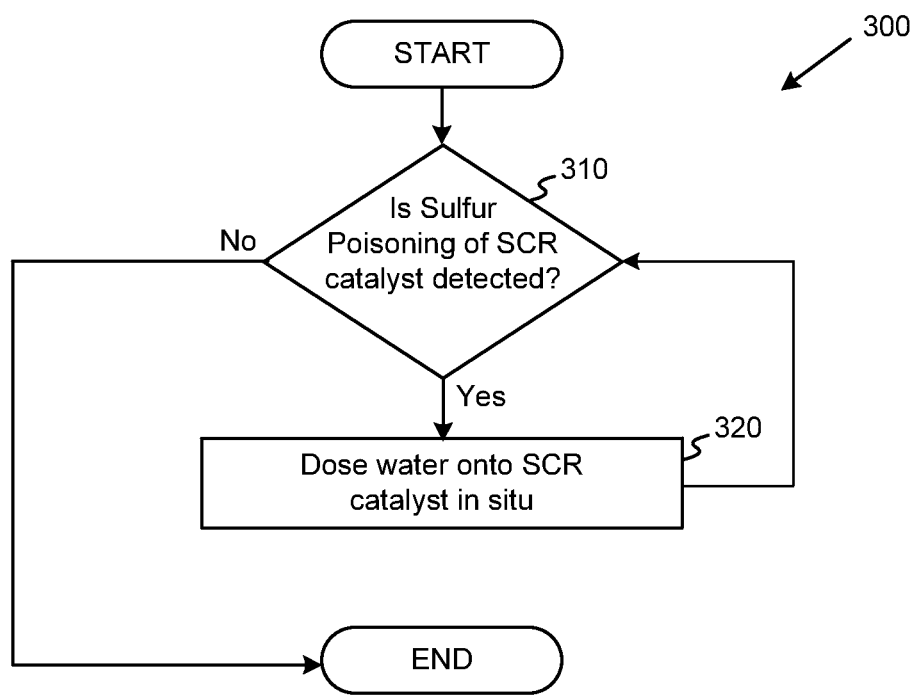
FIG. 6 is a flow chart diagram depicting a method for diagnosing and treating an in situ vanadium-poisoned SCR catalyst according to one embodiment.

Referring to FIG. 6, a method 300 for treating an SCR catalyst of an engine system (e.g., an exhaust system of the engine system) while the SCR catalyst is installed in the exhaust system is shown. The method 300 may be performed via operation of the engine system 10 as discussed above. The method 300 begins by detecting or determining if the SCR catalyst is poisoned with a contaminant, such as sulfur, at 310. According to certain implementations, an SCR catalyst is determined to be poisoned with a contaminant when the measured or estimated quantity of contaminant on the SCR catalyst reaches a predetermined level. If the SCR catalyst is not poisoned with a contaminant, then the method 300 ends. However, if the SCR catalyst is poisoned with a contaminant, then the method 300 proceeds to dose or apply water onto the SCR catalyst while installed in the exhaust system at 320. Dosing water on the installed SCR catalyst at 320 may include dosing water into exhaust gas upstream of the SCR catalyst and/or dosing water directly onto the SCR catalyst. After dosing water onto the SCR catalyst at 320, the illustrated method 300 returns to re-determine whether the SCR catalyst is poisoned with a contaminant at 310.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A selective catalytic reduction (SCR) catalyst treatment system, comprising:
   a vanadium-based SCR catalyst contaminated with a water-soluble contaminant;
   a first contaminant detection device configured to detect a quantity of contaminant on the vanadium-based SCR catalyst;
   a water delivery system configured to apply water to the vanadium-based SCR catalyst to remove the water-soluble contaminant from the vanadium-based SCR catalyst; and
   a controller electrically coupled to the first contaminant detection device and the water delivery system, the controller configured to:
   (a) compare the quantity of the contaminant determined by the first contaminant detection device with a threshold value; and
   (b) command the water delivery system to apply water to the vanadium-based SCR catalyst in response the quantity of the contaminant meeting the threshold value.

2. The SCR catalyst treatment system of claim 1, wherein the water-soluble contaminant comprises sulfur.

3. The SCR catalyst treatment system of claim 2, wherein the water-soluble contaminant comprises a sulfate salt.

4. The SCR catalyst treatment system of claim 3, wherein the water-soluble contaminant comprises at least one of ammonium sulfate salt or ammonium bisulfate salt.

5. The SCR catalyst treatment system of claim 1, wherein the water delivery system comprises a vessel containing water, and wherein the vanadium-based SCR catalyst is positioned within the water contained by the vessel.

6. The SCR catalyst treatment system of claim 5, further comprising a contaminant removal verification system comprising a second contaminant detection device to detect a quantity of contaminant in the water.

7. The SCR catalyst treatment system of claim 6, wherein the second contaminant detection device to detect the quantity of contaminant in the water is different than the first contaminant detection device to detect the quantity of contaminant on the vanadium based SCR catalyst.

8. The SCR catalyst treatment system of claim 6, wherein the contaminant removal verification system determines removal of the contaminant from the vanadium based SCR catalyst based on a difference between the quantity of contaminant on the vanadium-based SCR catalyst and the quantity of contaminant in the water.

9. The SCR catalyst treatment system of claim 8, wherein the removal verification system indicates the vanadium-based SCR catalyst is decontaminated if the difference between the quantity of contaminant on the vanadium-based SCR catalyst and the quantity of contaminant in the water is below a threshold.

10. The SCR catalyst treatment system of claim 1, further comprising an exhaust aftertreatment system in exhaust gas receiving communication with an internal combustion engine, wherein the vanadium-based SCR catalyst is positioned within the exhaust aftertreatment system, and the water delivery system is coupled to the exhaust aftertreatment system and configured to dose water into the exhaust aftertreatment system.

11. The SCR catalyst treatment system of claim 10, wherein the water delivery system comprises a water source and a doser that injects water from the water source into exhaust gas upstream of the vanadium-based SCR catalyst.

12. The SCR catalyst treatment system of claim 10, wherein the water delivery system comprises a water source and a doser that injects water from the water source directly onto the vanadium-based SCR catalyst.

13. A method for treating a selective catalytic reduction (SCR) catalyst contaminated with a sulfur component, comprising:
   determining a first amount of sulfur component on the SCR catalyst;
   comparing the determined first amount with a first threshold value;
   in response to the first amount meeting the first threshold value, removing the first amount of sulfur component from the SCR catalyst via a process consisting of applying water to the SCR catalyst;
   determining a second amount of sulfur component in the applied water;
   determining a difference between the determined first amount and the determined second amount;

comparing the difference with a second threshold value; and in response to the difference being less than the second threshold value, reusing the SCR catalyst.

14. The method of claim 13, wherein the SCR catalyst is a vanadium-based SCR catalyst and the sulfur component comprises a sulfate salt.

15. The method of claim 13, wherein applying water to the SCR catalyst comprises soaking the SCR catalyst in water.

16. The method of claim 13, wherein the SCR catalyst form part of an exhaust aftertreatment system, and applying water to the SCR catalyst comprises dosing water into the exhaust aftertreatment system.

17. A selective catalytic reduction (SCR) catalyst treatment system, comprising:
   a vanadium-based SCR catalyst contaminated with a sulfate salt;
   a vessel containing a volume of water, the vanadium-based SCR catalyst being positioned within the volume of water, wherein the water removes the sulfate salt from the vanadium-based SCR catalyst over time;
   a first sulfate salt detection device that measures a quantity of sulfate salt on the vanadium-based SCR catalyst;
   a second sulfate salt detection device that measures a quantity of sulfate salt in the volume of water after the water removes the sulfate salt from the vanadium-based SCR catalyst over time; and
   a verification feature configured to:
      (a) compare the quantity of sulfate salt in the vanadium-based SCR catalyst and the quantity of sulfate salt in the volume of water to determine a difference; and
      (b) in response to the difference being more than a threshold amount, indicate that the SCR catalyst has not been sufficiently cleaned of sulfate salt.

18. The method of claim 17, wherein the verification feature is further configured to:
   in response to the difference being more than the threshold amount, reapply water to the SCR catalyst.

19. The method of claim 17, wherein the threshold amount is in the range of 0.03% by weight to 0.2% by weight.

* * * * *